United States Patent
Wang et al.

(10) Patent No.: US 11,733,536 B1
(45) Date of Patent: Aug. 22, 2023

(54) PERIODIC OPTIMIZATION METHOD FOR DIFFRACTIVE OPTICAL ELEMENT

(71) Applicant: HANGZHOU UPHOTON OPTOELECTRONICS TECHNOLOGY CO., LTD., Zhejiang (CN)

(72) Inventors: Muyun Wang, Zhejiang (CN); Dongliang Zhang, Zhejiang (CN)

(73) Assignee: HANGZHOU UPHOTON OPTOELECTRONICS TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 18/004,106

(22) PCT Filed: Jul. 5, 2021

(86) PCT No.: PCT/CN2021/104476
§ 371 (c)(1),
(2) Date: Jan. 3, 2023

(87) PCT Pub. No.: WO2022/002273
PCT Pub. Date: Jan. 6, 2022

(30) Foreign Application Priority Data

Jul. 3, 2020 (CN) .......... 202010636814.X

(51) Int. Cl.
*G02B 27/42* (2006.01)
*G02B 27/00* (2006.01)
(52) U.S. Cl.
CPC ..... *G02B 27/4266* (2013.01); *G02B 27/0012* (2013.01)

(58) Field of Classification Search
CPC .............. G02B 27/4266; G02B 27/0012
(Continued)

(56) References Cited

U.S. PATENT DOCUMENTS

2013/0229619 A1\* 9/2013 Becken .............. G02C 7/02
351/159.77

FOREIGN PATENT DOCUMENTS

| CN | 102654590 A | 9/2012 |
| CN | 108919487 A | 11/2018 |

(Continued)

OTHER PUBLICATIONS

International Search Report issued in corresponding International Application No. PCT/CN2021/104476, dated Sep. 28, 2021, pp. 1-6, CNIPA, Beijing, China.

*Primary Examiner* — Wyatt A Stoffa
*Assistant Examiner* — Mitchell T Oestreich
(74) *Attorney, Agent, or Firm* — Hauptman Ham, LLP

(57) ABSTRACT

A periodic optimization method for a diffractive optical element includes converting coordinates of individual target spots of a target spot array into angular spectrum coordinates, selecting an initial period, calculating diffraction orders of individual target spots, rounding the diffraction order, calculating the coordinates of actual projection spots by using the rounded diffraction orders, calculating evaluation indicator of period optimization, adjusting the period, and repeating the steps, and comparing the evaluation indicators to determine an optimal period for the diffractive optical element. With the periodic optimization method, an actual spot array is made to match a target spot array to the greatest possible extent with a small amount of calculations, thereby improving the design quality and accuracy of a diffractive optical element.

9 Claims, 4 Drawing Sheets

(58) Field of Classification Search
USPC .......................................................... 359/558
See application file for complete search history.

(56) References Cited

FOREIGN PATENT DOCUMENTS

| | | |
|---|---|---|
| CN | 109270806 A | 1/2019 |
| CN | 110221447 A | 9/2019 |
| CN | 111736336 A | 10/2020 |
| JP | 2000231012 A | 8/2000 |

* cited by examiner

| Coordinates of target spots (mm) | | Diffraction angles of target spots (rad) | | Diffraction orders of target spots | | Odd digit rounding | | Convert to order distance | | Diffraction angles (rad) | | Diagonal | Adjusted plane coordinates (mm) | | Absolute difference of coordinates |
|---|---|---|---|---|---|---|---|---|---|---|---|---|---|---|---|
| $x_i$ | $y_i$ | $\theta_{xi}$ | $\theta_{yi}$ | $m_i$ | $n_i$ | $m_i'$ | $n_i'$ | | | $\theta_{xi}'$ | $\theta_{yi}'$ | | $x_i'$ | $y_i'$ | |
| -377.23 | -357.04 | -0.4476 | -0.422 | -286.01 | -222 | -286 | -222 | -286 | -222 | -0.44755 | -0.422 | 0.58149 | -377.21 | -357.04 | 0.0169 | 0.00042 |
| -336.04 | 0 | -0.4476 | 0 | -286.01 | 0 | -286 | 0 | -286 | 0 | -0.44755 | 0 | 0.44755 | -336.02 | 0 | 0.01573 | 0 |
| -377.23 | 357.042 | -0.44756 | 0.42203 | -286.01 | 221.998 | -286 | 222 | -286 | 222 | -0.44755 | 0.42204 | 0.58149 | -377.21 | 357.042 | 0.0169 | 0.00042 |
| 0 | -314.31 | 0 | -0.422 | 0 | -222 | 0 | -222 | 0 | -222 | 0 | -0.422 | 0.42204 | 0 | -314.31 | 0 | 0.00236 |
| 0 | 314.309 | 0 | 0.42203 | 0 | 221.999 | 0 | 222 | 0 | 222 | 0 | 0.42204 | 0.42204 | 0 | 314.311 | 0 | 0.00236 |
| 377.226 | -357.04 | 0.44756 | -0.422 | 286.01 | -222 | 286 | -222 | 286 | -222 | 0.447546 | -0.422 | 0.58149 | 377.208 | -357.04 | 0.0169 | 0.00042 |
| 336.038 | 0 | 0.44756 | 0 | 286.011 | 0 | 286 | 0 | 286 | 0 | 0.447546 | 0 | 0.44755 | 336.022 | 0 | 0.01573 | 0 |
| 377.225 | 357.042 | 0.44756 | 0.42203 | 286.01 | 221.998 | 286 | 222 | 286 | 222 | 0.447546 | 0.42204 | 0.58149 | 377.208 | 357.042 | 0.0169 | 0.00042 |

Fig.3

PERIODIC OPTIMIZATION METHOD FOR DIFFRACTIVE OPTICAL ELEMENT

The present application is a U.S. National Phase of International Application No. PCT/CN2021/104476, filed Jul. 5, 2021, which claims the priority of a Chinese patent application submitted to the Chinese Patent Office on Jul. 3, 2020, with application number 202010636814.X and invention title "Periodic Optimization Method for diffractive optical element".

FIELD OF THE INVENTION

The invention relates to the field of diffractive optics, and more specifically, to a periodic optimization method for diffractive optical element.

BACKGROUND

With application of 3D face unlocking technology in mobile phones, 3D depth perception technology based on structured light has become a hot direction of technology development. Among others, laser speckle projector is one of the key devices for depth sensing technology based on structured light, and coded pattern projected thereby will directly affect the complexity of depth decoding calculation and the accuracy and resolution of depth measurement.

In structure, a laser speckle projector mainly comprises a light source and a diffractive optical element. The diffractive optical element can be designed for collimated light or divergent light. When the diffractive optical element is designed for collimated light, the laser speckle projector also comprises collimating lens to collimate the light emitted by the light source. The light source uses preferably a VCSEL (vertical cavity surface emitting laser). Compared with light-emitting diode (LED) and laser diode (LD), a VCSEL has an optical cavity orientation that is perpendicular to the semi-conductor wafer, and can emit light from the surface. It has the advantages of small size, circular light spot output, easy integration into a large area lattice, etc. As optical modulators, diffractive optical elements are used to modulate incident light to form a predetermined light-split spot array on a target plane and to incorporate therewith an arrayed distribution pattern of VCSELs per se, that is, to obtain a convolution of the arrayed distribution pattern of the VCSELs and the light-split spot array formed by the diffractive optical elements, so as to form a laser speckle pattern (that is, a projected coded pattern) over a target field of view on the target plane. The coded pattern will directly affect the complexity of depth decoding calculation and the accuracy and resolution of depth measurement.

In order to cooperate with depth extraction algorithm to improve accuracy and resolution of depth measurement, each spot of the light-split spot array formed by the diffractive optical element on the target plane is required to have accurate positioning. However, due to the limitation of the design theory of the diffractive optical element, the actual spatial position of the light-split spot array is difficult to excellently match the positioning aimed to be achieved by the design.

SUMMARY

The purpose of the invention is to realize an excellent matching between the spatial position of the actual light-split spot array and the positioning position required by the design as far as possible by optimizing the design period of the diffractive optical element.

According to one aspect of the present disclosure, a periodic optimization method for diffractive optical element is provided, wherein the diffractive optical element is used to project structured light of spot array, and the method comprises the following steps:

(1) calculating diffraction angles of individual target spots $A_i$ of a target spot array in X direction and Y direction based on coordinates $(x_i, y_i)$ of the target spots $A_i$ of the target spot array in X and Y directions and a distance a between the diffractive optical element and a target plane $(\theta_{xi}, \theta_{yi})$, where i is an integer, $\theta_{xi}=\arctan(x_i/\sqrt{(y_i)^2+(a)^2})$, and $\theta_{yi}=\arctan(y_i/\sqrt{(x_i)^2+(a)^2})$;

(2) selecting initially a period $d_j$ of the diffractive optical element, wherein the period is determined by a product of a pixel size and a number of pixels, and the number of pixels is a positive integer;

(3) calculating diffraction orders $(m_i, n_i)$ of the individual target spots $A_i$ in X direction and Y direction, wherein $m_i=\sin\theta_{xi}/\sin\Delta\theta$, $n_i=\sin\theta_{yi}/\sin\Delta\theta$, $\sin\Delta\theta=\lambda/d_j$, $\lambda$ is a wavelength of a light source;

(4) rounding the diffraction orders $(m_i, n_i)$ to obtain rounded diffraction orders $(m_i', n_i')$;

(5) calculating coordinates $(x_i', y_i')$ of actual projection spots $A_i'$ in X direction and Y direction by using the rounded diffraction orders $(m_i', n_i')$;

(6) calculating an evaluation indicator of period optimization based on the coordinates of individual target spots $A_i$ and those of their corresponding actual projection spots $A_i'$;

(7) adjusting the period $d_j$ to $d_{j+1}$, and repeating the above steps (3)-(6) to calculate the evaluation indicator of period optimization with the period $d_{j+1}$; and (8) determining an optimal period of the diffractive optical element according to the evaluation indicators of period optimization.

A light-split spot array can be obtained by using diffractive optical elements having different periods. According to the invention, by comparing the difference between the coordinates of the actual projection spots and the coordinates of individual target spots, and taking the period used when the difference is minimal as the optimal period, it is possible to make the actually obtained light-split spot array match excellently the aimed positioning of the target light-split spot array, thereby optimizing the designed period of the diffractive optical element.

Preferably, the evaluation indicator of period optimization is any one of the following: a distance mean between the individual target spots $A_i$ and their corresponding actual projection spots $A_i'$, a maximum distance between the individual target spots $A_i$ and their corresponding actual projection spots $A_i'$, a sum of distances between individual target spots $A_i$ and their corresponding actual projection spots $A_i'$, and a maximum absolute difference of abscissas and/or ordinates between individual target spots $A_i$ and their corresponding actual projection spots $A_i'$.

The evaluation indicator of period optimization is not limited to those listed above, and any appropriate evaluation indicators of period optimization that can be used to determine the optimal period according to the method of the present invention are within the protection scope of the invention.

Preferably, the distance mean is any one selected from a group consisted of arithmetic mean, geometric mean, harmonic mean, weighted mean and root mean square.

The distance mean is an evaluation indicator used according to the invention, and the distance mean can be any appropriate mean value.

Preferably, a minimum value of the evaluation indicators of period optimization is obtained by comparing the evaluation indicators of period optimization obtained, and the period corresponding to the minimum value is determined as the optimal period.

Generally, the minimum value of the difference between the actual projection spots and the target spots can be determined by comparing the evaluation indicators of period optimization to obtain its minimum value, and then the period corresponding to the minimum value is determined as the optimal period. This method is simplified and easy to be carried out.

Preferably, genetic algorithm is used to obtain the minimum value.

Other algorithms or methods for obtaining the minimum value are also within the protection scope of the invention.

Preferably, in the step (7), the period $d_j$ is adjusted to the period $d_{j+1}$ by fixing the pixel size and increasing the number of pixels by a pixel number increment.

Preferably, on the premise that the pixel size adapts to the processing accuracy, the period $d_j$ is adjusted to the period $d_{j+1}$ by increasing the product of the pixel size and the number of pixels by a product increment.

Preferably, in the step (4), rounding is carried out with any method selected from a group consisted of rounding to the nearest integer, rounding down, rounding up, odd digit rounding, and even digit rounding.

The rounding in the periodic optimization method for diffractive optical element according to the invention can be carried out with various methods which are not limited to the above listed, and any other appropriate methods that can round the diffraction order are also within the protection scope of the invention.

Preferably, the period $d_{j+1}$ is less than or equal to the size of the diffractive optical element.

In the periodic optimization method for diffractive optical element according to the invention, the selected period of the diffractive optical element cannot be expanded infinitely, but is physically limited by the actual size of the diffractive optical element.

According to the periodic optimization method for diffractive optical element of the invention, the actual light-split spot array projected by the diffractive optical element can be made to match the target light-split spot array as much as possible with a relative small amount of calculation, and design quality and accuracy of the diffractive optical element can be improved.

BRIEF DESCRIPTION OF THE DRAWINGS

Other features, objects, and advantages of the invention will become more apparent by reading the following detailed description of non-limitative embodiments with reference to the following drawings.

FIG. 3 is the calculation data table for achieving the target spot array shown in FIG. 2 by using the periodic optimization method for diffractive optical element of the present invention.

DETAILED DESCRIPTION

Figure 1:
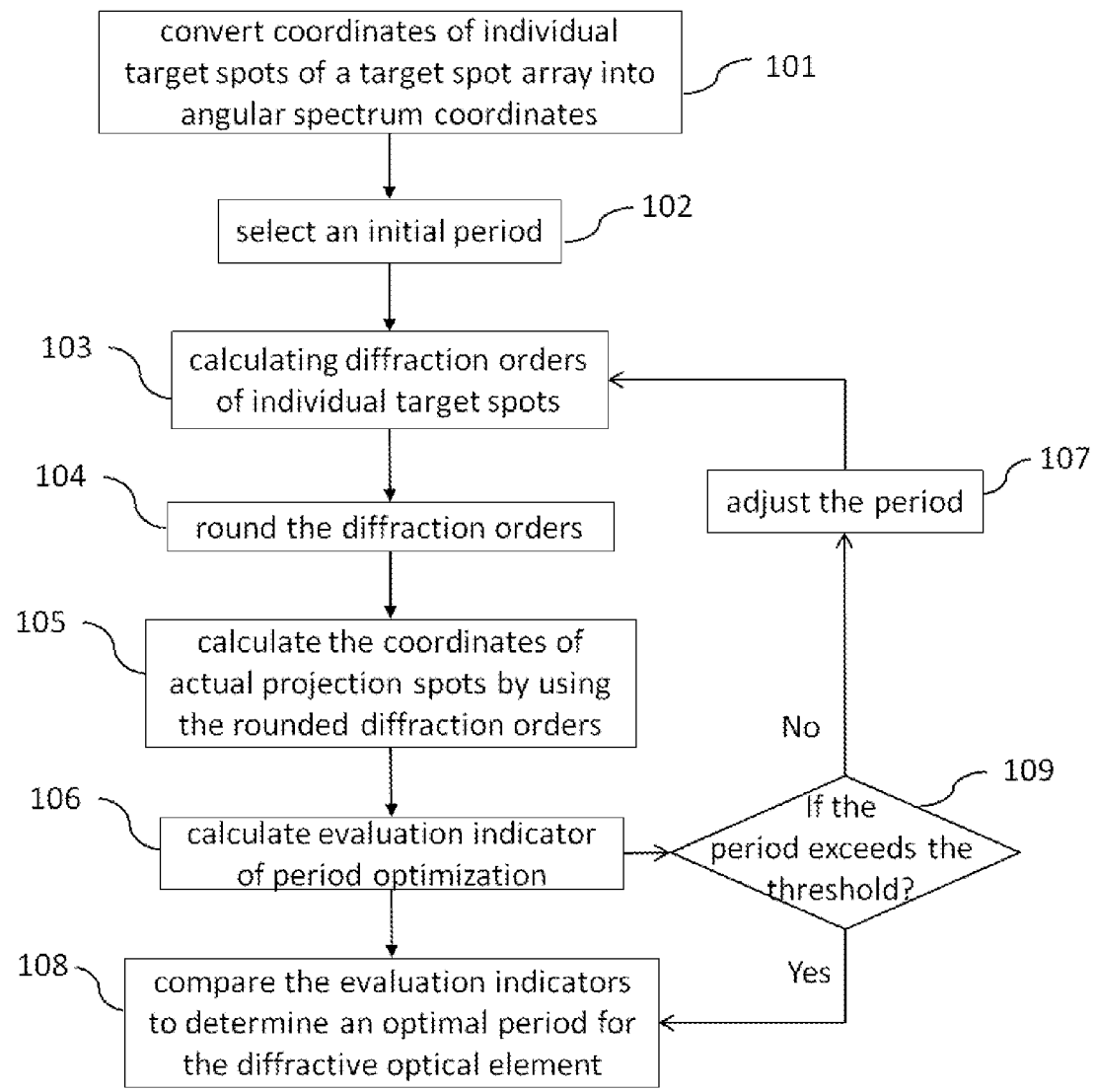
FIG. 1 is a flowchart of a periodic optimization method for diffractive optical element according to the present invention.

The invention will be further described in detail in conjunction with drawings and embodiments. It should be understood that the specific embodiments described herein are only used to explain the related invention, but not to limit the invention. In addition, it should be noted that, for the convenience of description, only the parts related to the invention are shown in the drawings.

Diffractive optical elements used for light-split spot array projection are generally designed in the form of periodic dense arrangement. A diffractive optical element has a microstructure surface, which comprises a number of microstructure pattern units arranged adjacent to each other in the form of an array. Every one of the microstructure pattern units has the same microstructure pattern (phase). That is, each microstructure pattern unit can modulate the phase of the incident light, so as to project the light-split spot array on the target plane. The size of the microstructure pattern unit is called period of the diffractive optical element. Processing accuracy of the diffractive optical element determines pixel size of the diffractive optical element. The period and the pixel size of the diffractive optical element determine the number of pixels of a single microstructure pattern unit. Period of a diffractive optical element determines an angular resolution of diffractive light: $\sin \Delta\theta = \lambda/d$, wherein $\Delta\theta$ is the angular resolution, $\lambda$ is the wavelength of the incident light, and d is the period. The greater the period d is, the smaller the angular resolution $\Delta\theta$ is; and the smaller the angular resolution $\Delta\theta$ is, the finer adjustment of the position of the spots of the projected light-split spot array the diffractive optical element can achieve. It is easy for those skilled in the art to understand that the diffractive optical element used for projecting light-split spot array can also be designed to have one single period for divergent light. In such a case, the size of the diffractive optical element is the period size of the diffractive optical element. The present invention intends to cover both the design with periodic dense arrangement and the design with one single period.

With a certain processing accuracy, that is, with a predetermined pixel size, the larger the period is, the more pixels a single microstructure pattern unit can have, and the more flexible the design of the diffractive optical element can be, such that the more flexible modulation of incident light can be carried out to generate more complex and finer projection patterns. However, the larger the number of pixels is, the more difficult the design of the diffractive optical element is, and the longer it takes for the computer aided program to calculate. Being limited by size of a product, the period of the diffractive optical element cannot be expanded indefinitely. Therefore, it is necessary to optimize the period of the diffractive optical element.

FIG. 1 is a flowchart of a periodic optimization method for diffractive optical element according to the present invention.

Detailed description of steps of the periodic optimization method for diffractive optical element according to the present invention will be given below with reference to FIG. 1.

In step 101, diffraction angles $(\theta_{xi}, \theta_{yi})$ of individual target spots $A_i$ of a target spot array in X direction and Y direction are calculated based on coordinates $(x_i, y_i)$ of the target spots $A_i$ of the target spot array in X direction and Y direction and a distance a between the diffractive optical element and a target plane, where i is an integer, $\theta_{xi}=\arctan(x_i/\sqrt{(y_i)+(a)^2})$, and $\theta_{yi}=\arctan(y_i/\sqrt{(x_i)^2+(a)^2})$.

Generally, angular spectrum resolution is calculated in the design of a diffractive optical element, and so in step 101, the coordinates of the target spot array are converted from plane coordinates to angular spectral coordinates.

In step 102, a period $d_j$ of the diffractive optical element is selected initially, wherein the period is determined by a product of a pixel size and a number of pixels, and the number of pixels is a positive integer.

In step 103, diffraction orders $(m_i, n_i)$ of the individual target spots $A_i$ in X direction and Y direction of individual target spots $A_i$ are calculated based on the obtained diffraction angles $(\theta_{xi}, \theta_{yi})$ and the period $d_j$ of the diffractive optical element selected initially, wherein $m_i = \sin \theta_{xi}/\sin \Delta\theta$, $n_i = \sin \theta_{yi}/\sin \Delta\theta$, $\sin \Delta\theta = \lambda/d_j$, $\lambda$ is a wavelength of a light source, and $\Delta\theta$ is the angular resolution which is determined by the period $d_j$.

In step 104, the diffraction orders $(m_i, n_i)$ are rounded to obtain rounded diffraction orders $(m_i', n_i')$. In fact, diffraction orders are integer, so the calculated diffraction orders $(m_i, n_i)$ need to be rounded.

In step 105, coordinates $(x_i', y_i')$ of actual projection spots $A_i'$ in X direction and Y direction are calculated by using the rounded diffraction orders $(m_i', n_i')$ In step 105, the spots on the angular spectrum are converted to spots on the plane where the target spot array lies, so that the coordinates $(x_i', y_i')$ of the actual projection spots $A_i'$ in the X direction and Y direction can be compared with the coordinates $(x_i', y_i')$ of the corresponding target spots of the target spot array.

In step 106, an evaluation indicator of period optimization is calculated based on the coordinates of individual target spots $A_i$ and those of their corresponding actual projection spots $A_i'$.

Since the period $d_j$ of the diffractive optical element is limited by the actual size of the diffractive optical element, in step 109, it is judged whether the period exceeds the limit value of the actual size of the diffractive optical element. If not, proceed to the following steps.

In step 107, the period $d_j$ is adjusted to period $d_{j+1}$, and the above steps 103~106 are repeated to calculate the evaluation indicator of period optimization with the period $d_{j+1}$.

In step 108, an optimal period of the diffractive optical element is determined according to the evaluation indicators of period optimization.

Next, taking a 3×3 array as an example of the target spot array, an embodiment of the periodic optimization method for diffractive optical element according to the present invention is described in details.

Figure 2:
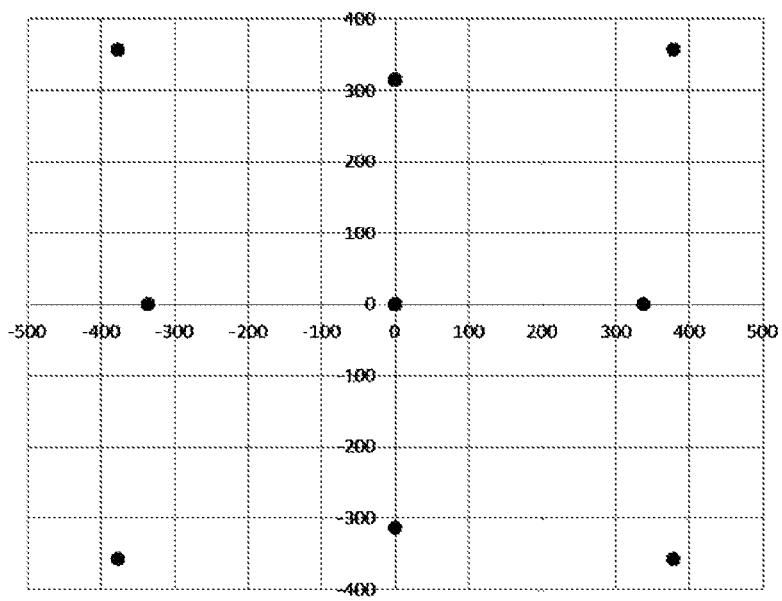
FIG. 2 is a chart showing the target spot array and its coordinates.

FIG. 2 is graph showing a 3×3 spot array and its coordinates; FIG. 3 is a calculation data table showing how the periodic optimization method of diffractive optical element according to the invention is carried out to achieve the 3×3 spot array shown in FIG. 2. In this embodiment, the distance between the diffractive optical element and the target plane is 700 mm, the pixel size is 0.23 μm, and the wavelength of light source is 0.94 μm.

The coordinates $(x_i, y_i)$ of the target spots in FIG. 3 are respective coordinates of individual target spots of the 3×3 spot array. Diffraction angles $(\theta_{xi}, \theta_{yi})$ of the target spots in FIG. 3 are calculated with the formulas $\theta_{xi}=\arctan(x_i/\sqrt{(y_i)^2+(a)^2})$, and $\theta_{yi}=\arctan(y_i/\sqrt{(x_i)^2+(a)^2})$, where a is the distance between the diffractive optical element and the target plane, which is 700 mm in this embodiment.

In this embodiment, the period of the diffractive optical element is initially selected to be 621.23 μm. The period of the diffractive optical element is determined by the product of the pixel size and the number of pixels. The known pixel size is 0.23 μm, and then the number of pixels is 2701.

Then, based on the diffraction angles $(\theta_{xi}, \theta_{yi})$ of the target spots, the initially selected period 621.23 μm and the known wavelength of light source 0.94 μm, the diffraction orders $(m_i, n_i)$ of the target spots in FIG. 3 are calculated with the formulas $m_i=\sin \theta_{xi}/\sin \Delta\theta$, $n_i=\sin \theta_{yi}/\sin \Delta\theta$, $\sin \Delta\theta=\lambda/d_j$.

Then, the calculated diffraction orders $(m_i, n_i)$ of the target spots are rounded to obtain the rounded diffraction orders $(m_i', n_i')$. In this embodiment, odd digit rounding is used. Since the diffraction order starts from Order 0, an odd digit is corresponding to an even number of diffraction orders. In the data table shown in FIG. 3, the odd digit rounding is to round off the decimal of a diffraction order with an even integer and to round up the diffraction order with an odd integer. Practice has proved that the diffractive optical element designed in this way has better light effect, lower non-uniformity of the spot array, and more uniform light spots in the light field. In this embodiment, the odd digit rounding method is a preferred rounding method.

The diffraction angles $(\theta_{xi}', \theta_{yi}')$ in FIG. 3 are the diffraction angles of the actual projection spots calculated based on the rounded diffraction orders $(m_i', n_i')$, and thus based on the diffraction angles $(\theta_{xi}', \theta_{yi}')$ of the actual projection spots, coordinates $(x_i', y_i')$ of the actual projection spots on the target plane can be further calculated.

In this embodiment, the position difference between the target spots and the actual projection spots is evaluated by calculating the absolute difference between the coordinate $(x_i, y_i)$ of each target spot and the corresponding coordinate $(x_i', y_i')$ of the actual projection spot in X direction and Y direction, respectively. The data of the absolute difference of coordinates in FIG. 3 are the data calculated.

Figure 4:
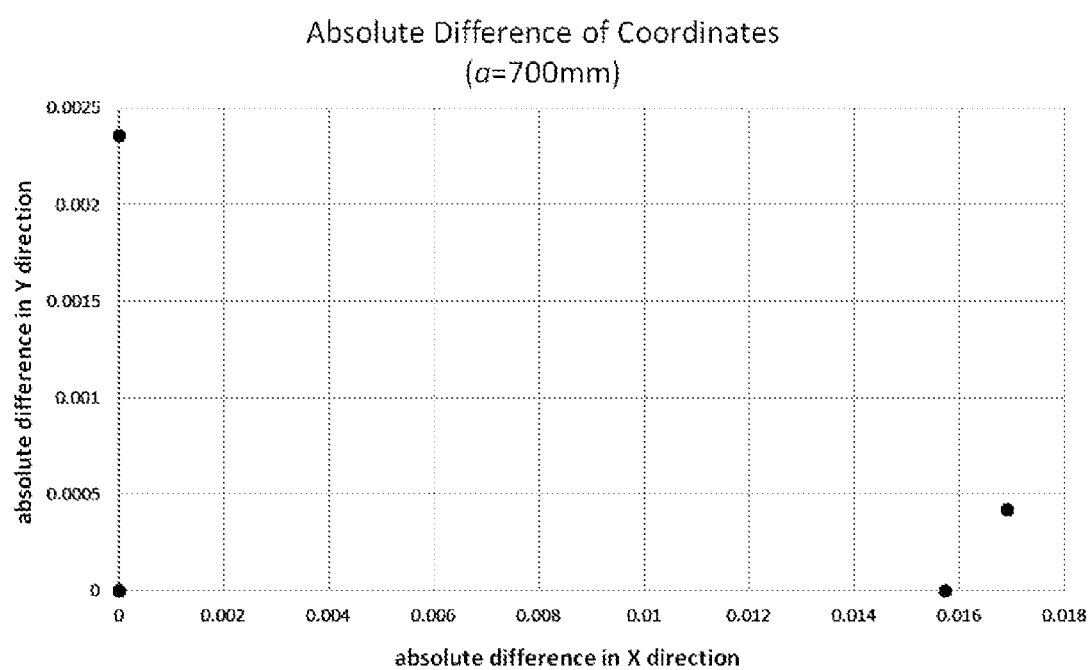
FIG. 4 is a chart showing absolute difference of coordinates obtained from the data in FIG. 3.

FIG. 4 is a chart showing the absolute differences of coordinates obtained based on the data in FIG. 3. The maximum of the absolute differences of coordinates is selected as the evaluation indicator of period optimization for the diffractive optical element.

Thus, calculation of the evaluation indicator of period optimization, that is, the absolute difference of coordinates between the target diffraction spots and the actual projection spots is fulfilled with a initially selected period of the diffractive optical element of 621.23 μm.

Then, the period of the diffractive optical element is adjusted to $d_{j+1}$. With a period of the calculation of the above absolute difference of coordinates is repeated, and the maximum absolute difference of coordinates obtained with each selected period is taken as the evaluation indicator of period optimization for the diffractive optical element, until the period $d_{j+1}$ is greater than or equal to the actual size of the diffractive optical element or it exceeds the preset threshold. The above preset threshold can be set according to the experience of those skilled in the art. For example, a lower threshold limit can be corresponding to the minimum number of pixels that can meet the requirement of the design flexibility to achieve uniform light splitting modulation of incident light, and an upper threshold limit can be corresponding to a number of pixels which will not significantly increase the time required for computer aided software to calculate the phase distribution of diffractive optical elements, so as to ensure the efficiency of designing diffractive optical elements.

The maximum value of the absolute difference of coordinates obtained with every selected period are compared, and the selected period corresponding to the minimum value of the maximum value of the absolute difference of coordinates is taken as the optimal period. In this embodiment, genetic algorithm is used to obtain the minimum value. The diffractive optical element designed with this optimal period can make the actual light-split spot array projected by the diffractive optical element match the target light-split spot array as much as possible.

It should be noted that in the embodiment described with reference to FIGS. 2-4, although the evaluation indicator of period optimization is the maximum absolute difference of coordinates, in fact, the evaluation indicator of period optimization can be any of the following: a distance mean between the individual target spots $A_i$ and their corresponding actual projection spots $A_i'$, or a maximum distance between the individual target spots $A_i$ and their corresponding actual projection spots $A_i'$, or a sum of distances between individual target spots $A_i$ and their corresponding actual projection spots $A_i'$, or a maximum absolute difference of abscissas and/or ordinates between individual target spots $A_i$ and their corresponding actual projection spots $A_i'$.

Moreover, when the distance mean is used as the evaluation indicator of period optimization, the distance mean can be any of the arithmetic mean, geometric mean, harmonic mean, weighted mean, and root mean square.

In the embodiment described with reference to FIGS. 2-4, the minimum value is calculated with genetic algorithm, but the invention is not limited to this, but rather other algorithms that can obtain the minimum value are also within the protection scope of the invention. The minimum value here is the minimum of the maximum absolute difference between the calculated coordinates and the target coordinates. The smaller this value is, the closer the calculated coordinates are to the target ones.

The period of the diffractive optical element is determined by the product of the pixel size and the number of pixels. The pixel size is usually determined by the processing accuracy. Therefore, when adjusting the period, the period $d_j$ is adjusted to the period $d_{j+1}$ by fixing the pixel size and increasing the number of pixels by a pixel number increment. On the premise that the pixel size adapts to the processing accuracy, the period $d_j$ can also be adjusted to the period $d_{j+1}$ by increasing the product of the pixel size and the number of pixels by a product increment. However, the product of the pixel size and the number of pixels, i.e. the period, should adapt to the product size specification, and should not be too large or too small. The adjustment range is limited by the actual size of a diffractive optical element.

In the embodiment described with reference to FIGS. 2-4, the diffraction orders $(m_i, n_i)$ of the target spots are rounded using the odd digit rounding method, which is the preferred rounding method for this embodiment. In other embodiments, even digit rounding can be used for rounding as needed, that is, the decimal of a diffraction order with odd integer digits can be rounded off, and a diffraction order with an even integer can be rounded up. The calculated diffraction orders can also be rounded with a method of rounding to the nearest integer, rounding down, or rounding up.

According to the periodic optimization method for diffractive optical element of the invention, the actual light-split spot array projected by the diffractive optical element can match the target light-split spot array as much as possible with a small amount of calculation, and design quality and accuracy of the diffractive optical element can be improved.

The above description is merely an illustration of the preferred embodiments of the present application and the applied technical principles. Those skilled in the art should understand that the scope of the invention involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A periodic optimization method for a diffractive optical element which is used to project structured light of spot array, characterized in that the method comprises the following steps:

(1) calculating diffraction angles $(\theta_{xi}, \theta_{yi})$ of individual target spots A of a target spot array in X direction and Y direction based on coordinates $(x_i, y_i)$ of the target spots A of the target spot array in X direction and Y direction and a distance a between the diffractive optical element and a target plane, where i is an integer, $\theta_{xi}=\arctan(x_i/\sqrt{(y_i)^2+(a)^2})$, and $\theta_{yi}=\arctan(y_i/\sqrt{(x_i)^2+(a)^2})$;

(2) selecting initially a period $d_j$ of the diffractive optical element, wherein the period is determined by a product of a pixel size and a number of pixels, and the number of pixels is a positive integer;

(3) calculating diffraction orders $(m_i, n_i)$ of the individual target spots $A_i$ in X direction and Y direction, wherein $m_i=\sin\theta_{xi}/\sin\Delta\theta$, $n_i=\sin\theta_{yi}/\sin\Delta\theta$, $\sin\Delta\theta=\lambda/d_j$, $\lambda$ is a wavelength of a light source;

(4) rounding the diffraction orders $(m_i, n_i)$ to obtain rounded diffraction orders $(m_i', n_i')$;

(5) calculating coordinates $(x_i', y_i')$ of actual projection spots $A_i'$ in X direction and Y direction by using the rounded diffraction orders $(m_i', n_i')$;

(6) calculating an evaluation indicator of period optimization based on the coordinates of individual target spots $A_i$ and those of their corresponding actual projection spots $A_i'$;

(7) adjusting the period $d_j$ to $d_{j+1}$, and repeating the above steps (3)-(6) to calculate the evaluation indicator of period optimization with the period $d_{j+1}$; and (8) determining an optimal period of the diffractive optical element according to the evaluation indicators of period optimization, wherein the evaluation indicator of period optimization is selected from a group consisted of: a distance mean between the individual target spots $A_i$ and their corresponding actual projection spots $A_i'$, a maximum distance between the individual target spots $A_i$ and their corresponding actual projection spots $A_i'$, a sum of distances between individual target spots $A_i$ and their corresponding actual projection spots $A_i'$, and a maximum absolute difference of abscissas and/or ordinates between individual target spots $A_i$ and their corresponding actual projection spots $A_i'$.

2. The periodic optimization method for the diffractive optical element of claim 1, wherein the distance mean is any one selected from a group consisted of arithmetic mean, geometric mean, harmonic mean, weighted mean and root mean square.

3. The periodic optimization method for the diffractive optical element of claim 1, wherein a minimum value of the evaluation indicators of period optimization is obtained by comparing the evaluation indicators of period optimization obtained, and the period corresponding to the minimum value is determined as the optimal period.

4. The periodic optimization method of the diffractive element of claim 3, wherein genetic algorithm is used to obtain the minimum value.

5. The periodic optimization method for the diffractive optical element of claim 1, wherein, in the step (7), the period $d_j$ is adjusted to the period $d_{j+1}$ by fixing the pixel size and increasing the number of pixels by a pixel number increment.

6. The periodic optimization method for the diffractive optical element of claim 1, wherein, on the premise that the pixel size adapts to the processing accuracy, the period $d_j$ is adjusted to the period $d_{j+1}$ by increasing the product of the pixel size and the number of pixels by a product increment.

7. The periodic optimization method for the diffractive optical element as claimed in claim 1, wherein, in the step (4), rounding is carried out with any method selected from a group consisted of rounding to the nearest integer, rounding down, rounding up, odd digit rounding, and even digit rounding.

8. The periodic optimization method for the diffractive optical element of claim 7, wherein the period $d_{j+1}$ is less than or equal to the size of the diffractive optical element.

9. The periodic optimization method for the diffractive optical element of claim 2, wherein a minimum value of the evaluation indicators of period optimization is obtained by comparing the evaluation indicators of period optimization obtained, and the period corresponding to the minimum value is determined as the optimal period.

* * * * *